United States Patent
Yin et al.

(10) Patent No.: US 12,013,226 B2
(45) Date of Patent: Jun. 18, 2024

(54) METHOD FOR CALIBRATING ROTATION CENTER BASED ON BLADE LOCAL LEADING-EDGE CURVE FEATURE

(71) Applicant: Sichuan University, Chengdu (CN)

(72) Inventors: Ming Yin, Chengdu (CN); Zongping Wang, Chengdu (CN); Haotian Zheng, Chengdu (CN); Luofeng Xie, Chengdu (CN); Haohao Liu, Chengdu (CN); Guofu Yin, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 381 days.

(21) Appl. No.: 17/392,551

(22) Filed: Aug. 3, 2021

(65) Prior Publication Data

US 2022/0128349 A1    Apr. 28, 2022

(30) Foreign Application Priority Data

Oct. 22, 2020   (CN) .......................... 202011134900.7

(51) Int. Cl.
*G01B 11/24* (2006.01)
*F04D 29/32* (2006.01)
*G01B 11/00* (2006.01)
*G01B 11/25* (2006.01)

(52) U.S. Cl.
CPC ............ *G01B 11/24* (2013.01); *F04D 29/324* (2013.01); *G01B 11/002* (2013.01); *G01B 11/2504* (2013.01); *F05D 2240/303* (2013.01); *G01B 11/2513* (2013.01); *G01B 11/2518* (2013.01)

(58) Field of Classification Search
CPC .............. G01B 11/002; G01B 11/2504; G01B 11/2513; G01B 11/2518; F05D 2240/303
See application file for complete search history.

(56) References Cited

U.S. PATENT DOCUMENTS

| | | | |
|---|---|---|---|
| 2011/0090514 A1* | 4/2011 | Robinson | F01D 25/285 356/601 |
| 2022/0339738 A1* | 10/2022 | Matsushita | F01D 5/10 |

* cited by examiner

*Primary Examiner* — Manuel A Rivera Vargas
(74) *Attorney, Agent, or Firm* — Crgo Global; Steven M. Greenberg

(57) ABSTRACT

The present disclosure provides a method for calibrating a rotation center based on a blade local leading-edge curve feature. The method acquires a blade local leading-edge curve feature before and after rotation, solves centroid coordinates according to maximum values in the blade local leading-edge curve features in the two times, and then solves a rotation center according to the centroid coordinates, thereby calibrating a coordinate of the rotation center. Compared with a point calibration method in the prior art, the present disclosure has a more accurate result by curve calibration and is more suitable for a real rotation center; and the method also has a more accurate blade measurement result when applied to measuring a blade cross-section curve feature.

2 Claims, 2 Drawing Sheets

METHOD FOR CALIBRATING ROTATION CENTER BASED ON BLADE LOCAL LEADING-EDGE CURVE FEATURE

CROSS REFERENCE TO RELATED APPLICATIONS

This patent application claims the benefit and priority of Chinese Patent Application No. 202011134900.7, filed on Oct. 22, 2020, the disclosure of which is incorporated by reference herein in its entirety as part of the present application.

BACKGROUND OF THE INVENTION

Field of the Invention

The present disclosure belongs to the field of blade measurement, and in particular, relates to a method for calibrating a rotation center based on a blade local leading-edge curve feature.

Description of the Related Art

Blades are core components of aviation engines, gas turbines, steam turbines and other devices, and play a vital role in conversion from heat energy to mechanical energy. The profile and quality of the blades directly affect the energy conversion efficiency and service life of the complete machines. The blades are difficult to be measured because the cross sections are irregularly free-form surfaces and each cross-section profile is different.

A Chinese invention patent 201911267259.1 discloses a method for measuring a blade based on line structured light. The method calibrates the center of the turntable by using a feature that the blade leading-edge profile has a maximum value on the cross section. Although solving the error arising from the transfer of a calibration sphere in the prior art, the method has a certain error in itself as it calibrates the center of the turntable by approximating the line between two points as a tangent line. Moreover, the method has a certain limitation, and is only applicable to blades having small curvature radii of leading-edge profiles.

BRIEF SUMMARY OF THE INVENTION

An objective of the present disclosure is to provide a method for calibrating a rotation center based on a blade local leading-edge curve feature. The method calibrates the center of the turntable with the blade leading-edge curve feature to achieve a wider application scope and a higher blade measurement accuracy.

To achieve the above objective, the present disclosure uses the following technical solutions:

A method for calibrating a rotation center based on a blade local leading-edge curve feature includes the following steps:

(1) putting a blade onto a turntable plane, and adjusting a pose of a line structured-light sensor such that a laser plane of the line structured-light sensor intersects with a leading-edge curve feature of the blade, the line structured-light sensor acquiring profile data $V_1 \in \mathbb{R}^{2 \times n_1}$ of the leading-edge curve feature of the present blade, selecting the maximum value $V_{1m}$ in the profile data $V_1$, and respectively taking n points along left and right sides of the $V_{1m}$ to form a data set $v_1 = [V_{1m-n} \cdots V_{1m} \cdots V_{1m+n}]_{1 \times (2n+1)}$ of a blade local leading-edge curve feature;

(2) ensuring that the pose of the line structured-light sensor is unchanged, the laser plane of the line structured-light sensor still intersects with a leading-edge curve feature of the blade after rotation of the turntable, and a rotation angle θ is 1-3°, acquiring profile data $V_2 \in \mathbb{R}^{2 \times n_2}$ of the leading-edge curve feature at this time, first selecting a maximum value $V_{2m}$ in the profile data $V_2$, finding a point $V_{2m-r}$ corresponding to the maximum value $V_{1m}$ in step (1) near the maximum value $V_{2m}$, respectively taking c reference points $V_{2m-r} \in [V_{2m-c} \cdots V_{2m} \cdots V_{2m+c}]_{1 \times (2c+1)}$ along left and right sides of the $V_{2m}$, and forming a profile data set $v_{2m-r} = [V_{(2m-r)-n} \cdots V_{2m-r} \cdots V_{(2m-r)+n}]_{1 \times (2n+1)}$ of a blade local leading-edge curve feature with n points in left and right sides of the $V_{2m-r}$;

(3) calculating covariance matrixes of the profile data sets $v_1$ and $V_{2m-r}$ of the blade local leading-edge curve features, solving eigenvectors and eigenvalues according to the covariance matrixes, and then establishing a matching function M between the maximum values $V_{1m}$ and $V_{2m-r}$ according to the eigenvectors and the eigenvalues:

$$M(V_{1m}, V_{2m-r}) = \Sigma_{d=1}^{2} \| \lambda_d^{r1} \chi_d^{r1} - \lambda_d^{r2m}(R_\theta \chi_d^{r2m}) \|^2$$

where, $\lambda_d^{r1}$ is the eigenvalue of the covariance matrix of the data set $v_1$; $\chi_d^{r1}$ is the eigenvector of the covariance matrix of the data set $v_1$; $\lambda_d^{r2m}$ is the eigenvalue of the covariance matrix of the data set $V_{2m-r}$; $\lambda_d^{r2m}$ is the eigenvector of the covariance matrix of the data set $v_{2m-r}$; and $$R_\theta = \begin{bmatrix} \cos\theta & \sin\theta \\ -\sin\theta & \cos\theta \end{bmatrix}$$

is a rotation matrix;

(4) selecting the data set $v_{2m-r}$ formed by different reference points $V_{2m-r}$, finding a reference point $V_{2m-k}$ corresponding to a minimum value in the matching function M, and taking n points along left and right sides of the reference point $V_{2m-k}$ to form a data set $v_2 = [V_{(2m-k)-n} \cdots V_{2m-k} \cdots V_{(2m-k)+n}]_{1 \times (2n+1)}$ of the blade local leading-edge curve feature; and (5) solving centroid coordinates $\overline{v_1}$ and $\overline{v_2}$ according to the profile data sets $v_1$ and $v_2$ of the blade local leading-edge curve features: $\overline{v_t} = (\Sigma_{i=1}^{2n+1} v_{ti})/(2n+1)$, t=1, 2, and $\overline{v_1}$ and $\overline{v_2}$ being respectively the centroid coordinates of the data sets $v_1$ and $v_2$ of the blade local leading-edge curve features; and solving a rotation center $O_b$ according to the two centroid coordinates $\overline{v_1}$ and $\overline{v_2}$.

Further, the data set $v_1$ of the blade local leading-edge curve feature in step (1) may be established through the following steps:

selecting the maximum value $V_{1m}$ in the profile data $V_1$ as a reference point, and nth points $V_{1m+n}$ and $V_{1m-n}$ along the left and right sides of the $V_{1m}$; and calculating a distance $d_{Ln}$ from the maximum value $V_{1m}$ to a line connecting the $V_{1m+n}$ and the $V_{1m-n}$, and selecting the $V_{1m+n}$ and the $V_{1m-n}$ having the $d_{Ln}$ more than or equal to an optimal measuring interval $d_z$ of the line structured-light sensor as endpoints of a blade local leading-edge data set, namely, the profile data set $v_1 = [V_{1m-n} \cdots V_{1m} \cdots V_{1m+n}]_{1 \times (2n+1)}$ of the blade local leading-edge curve feature:

$$d_{Ln} = \frac{|Kx_{1m} - y_{1m} + (y_{1m-n} - Ky_{1m-n})|}{\sqrt{K^2 + 1}},$$

where, $d_{Ln}$ is the distance from the maximum value $V_{1m}$ to the line connecting the $V_{1m+n}$, and the $V_{1m-n}$; and K is a slope of the line connecting the $V_{1m+n}$ and the $V_{1m-n}$.

Further, the rotation center coordinate $O_b$ may be solved with a following model:

$$o_b = [x\ y]^T = (R_\theta - E)^{-1}(R_\theta \overline{v_2} - \overline{v_1})$$

where, (x, y) is coordinate data of the rotation center $O_b$ in a data coordinate system;

$$R_\theta = \begin{bmatrix} \cos\theta & \sin\theta \\ -\sin\theta & \cos\theta \end{bmatrix}$$

is the rotation matrix;

$$E = \begin{bmatrix} 1 & 0 \\ 0 & 1 \end{bmatrix}$$

is a 2*2 identity matrix; and $\overline{v_1}$ and $\overline{v_2}$ are respectively the centroid coordinates of the data sets $v_1$ and $v_2$ of the blade local leading-edge curve features.

The method for calibrating a rotation center based on a blade local leading-edge curve feature is used to measure a blade cross-section profile, the blade cross-section profile being $P = [V_1^{o_b}\ V_2^{o_b}\ \ldots\ V_i^{o_b}\ \ldots\ V_n^{o_b}]$, $V_i^{o_b} = R_{\phi_i}(V_i + o_s o_b)$, where $R_{\phi_i}$ is a rotation matrix of a turntable at an ith time; $V_i$ is data acquired by a line structured-light sensor at the ith time; and $o_s o_b$ is a vector from an origin of a data coordinate system to a rotation center.

The present disclosure calibrates the rotation center by matching the blade local leading-edge curve features. Compared with the prior art in which the rotation center is calibrated by single-point matching, the present disclosure achieves the more accurate result and the better robustness because of the introduction of more feature points. Next, owing to the improved precision for calibrating the rotation center, the present disclosure further reduces the subsequent reconstruction error of the blade profile, to improve the blade measurement precision.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

With the measurement of a blade cross-section profile as an example, the calibration of a rotation center based on a blade leading-edge curve feature provided by the present disclosure as well as the measurement of the blade cross-section profile will be described in detail in the embodiment.

The embodiment provides a method for measuring a blade cross-section profile based on a blade leading-edge curve feature at a high precision, including the following steps:

(1) Calibration on Measurement Apparatus Before Blade Installation

Figure 1:
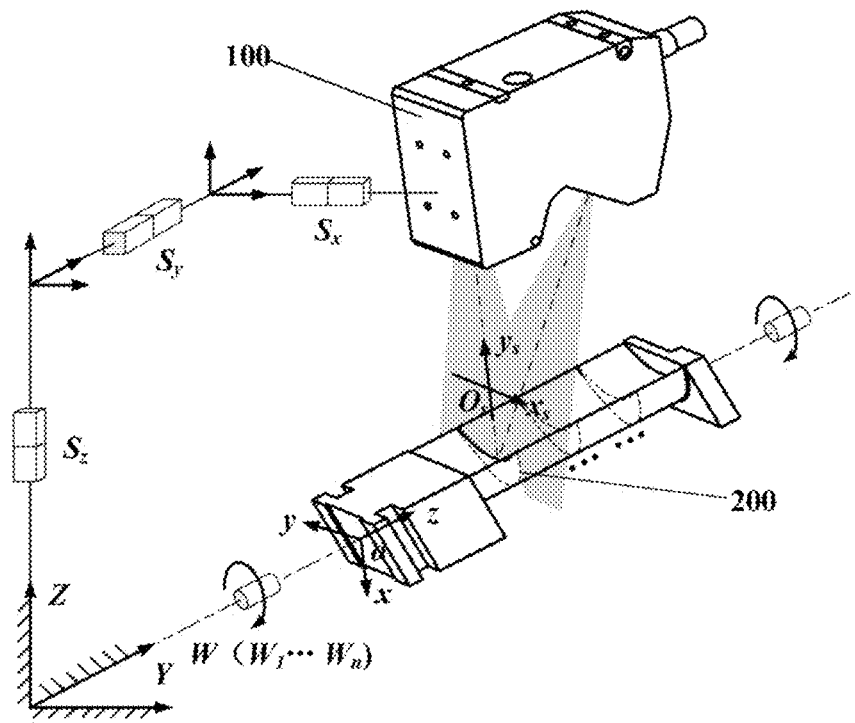
FIG. 1 is a schematic diagram of a measurement apparatus according to the present disclosure.

As shown in FIG. 1, the measurement apparatus includes a line structured-light sensor 100, a translational drive ($S_X$, $S_Y$, $S_Z$) for controlling motion of the line structured-light sensor within a moving coordinate system O-XYZ, and a rotational drive W for controlling rotation of a turntable. The turntable has a rotation center certainly. There is a need to calibrate the measurement apparatus before installation of the blade 200, to ensure the subsequent acquisition accuracy. The calibration includes pose calibration on the line structured-light sensor 100 and calibration on the turntable plane. The calibration method is the same as the prior art, and will not be repeated in the embodiment.

Figure 2:
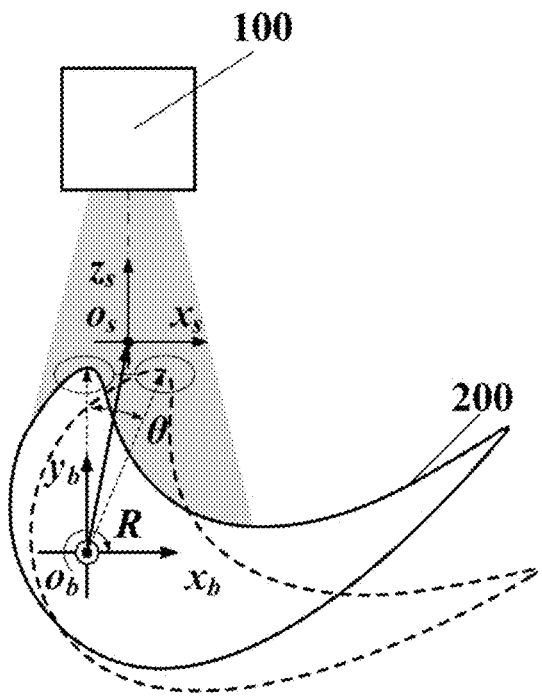
FIG. 2 is a schematic diagram of a measurement for calibrating a rotation center with a local leading-edge curve feature according to the present disclosure.
Figure 3:
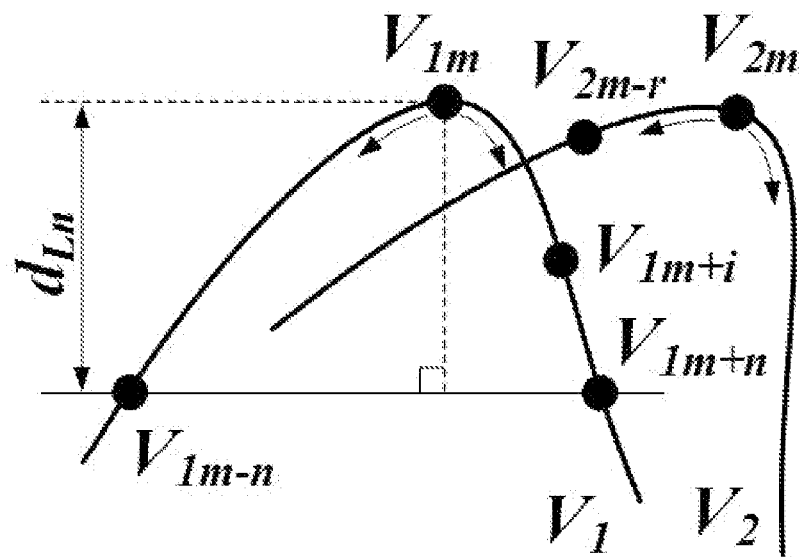
FIG. 3 is a schematic diagram of a measured local leading-edge curve feature according to the present disclosure.

(2) Calibration on Rotation Center of Turntable (a) Put the blade 200 onto the turntable plane, and adjust a pose of the line structured-light sensor 100 such that a laser plane of the line structured-light sensor 100 intersects with a leading-edge curve feature of the blade 200. As shown in FIG. 2, the solid line of the blade 200 is the blade cross-section profile in a present state, and the curve intersecting with the line structured-light sensor 100 is the leading-edge curve feature. The line structured-light sensor 100 acquires profile data $V_1 \in \mathbb{R}^{2 \times n_1}$ of the leading-edge curve feature of the present blade 200.

(b) Select a maximum value $V_{1m}$ in the profile data $V_1$, and sequentially select nth points $V_{1m+n}$ and $V_{1m-n}$ along left and right sides of the $V_{1m}$; and calculate a distance $d_{Ln}$ from the maximum value $V_{1m}$ to a line connecting the $V_{1m+n}$ and the $V_{1m-n}$, $$d_{Ln} = \frac{|Kx_{1m} - y_{2m} + (y_{1m-n} - Ky_{1m-n})|}{\sqrt{K^2 + 1}},$$

where, $d_{Ln}$ is the distance from the maximum value $V_{1m}$ to the line connecting the $V_{1m+n}$ and the $V_{1m-n}$, $K = (y_{1m-n} - y_{1m+n})/(x_{1m-n} - x_{1m+n})$ is a slope of the line connecting the $V_{1m+n}$ and the $V_{1m-n}$, $x_{1m}$ and $y_{1m}$ are data values of the $V_{1m}$, $x_{1m+n}$ and $y_{1m+n}$ are data values of the $V_{1m+n}$, and $x_{1m-n}$ and $y_{1m-n}$ are data values of the $V_{1m-n}$.

Select the $V_{1m+n}$ and the $V_{1m-n}$ having the $d_{Ln}$ just more than an optimal measuring value $d_z$ of the line structured-light sensor 100 as endpoints of a blade local leading-edge data set. The line structured-light sensor selected during implementation has the optimal measuring value $d_z$=0.25 mm, and has the high precision. The embodiment selects the $V_{1m+n}$ and the $V_{1m-n}$ having the $d_{Ln}$ just more than 0.25 mm as the endpoints of the blade local leading-edge data set, namely, a profile data set $v_1=[V_{1m-n} \ldots V_{1m} \ldots V_{1m+n}]_{1\times(2n+1)}$ of a blade local leading-edge curve feature.

(c) Ensure that the pose of the line structured-light sensor 100 is unchanged, the laser plane of the line structured-light sensor 100 still intersects with a leading-edge curve feature of the blade 200 after rotation of the turntable, and a rotation angle is θ. In the embodiment, the θ is 1°, 2° or 3°. As shown in FIG. 2, the dotted line is the rotated blade cross-section profile, and profile data $V_2 \in \mathbb{R}^{2\times n_2}$ of the leading-edge curve feature at this time is acquired. The maximum value in the $V_2$ is $V_{2m}$. As the θ is relatively small, the point corresponding to the maximum value $V_{1m}$ of the $V_1$ in the $V_2$ is certainly located near the $V_{2m}$, and thus the reference point $V_{2m-r}$ optimally corresponding to the $V_{1m}$ is found in the $V_2$. Sequentially take c points in left and right sides of the $V_{2m}$ as $V_{2m-r} \in [V_{2m-c} \ldots V_{2m} \ldots V_{2m+c}]_{1\times(2c+1)}$ and then take n points in left and right sides of the $V_{2m-r}$ selected each time to form a profile data set $v_{2m-r}=[V_{(2m-r)-n} \ldots V_{2m-r} \ldots V_{(2m-r)+n}]_{1\times(2n+1)}$ of a blade local leading-edge curve feature.

(d) Calculate covariance matrixes $COV(v_1)=\Sigma_{i=1}^{2n+1}(v_{1i}-\overline{v_1})(v_{1i}-\overline{v_1})^T$ and $COV(v_{2m-r})=\Sigma_{i=1}^{2n+1}(v_{2i}-\overline{v_{2m-r}})(v_{2i}-\overline{v_{2m-r}})^T$ of the profile data sets $v_1$ and $v_{2m-r}$ of the blade local leading-edge curve features, where $\overline{v_1}=(\Sigma_{i=1}^{2n+1}v_{1i})/(2n+1)$ and $\overline{v_{2m-r}}=(\Sigma_{i=1}^{2n+1}v_{(2m-r)i})/(2n+1)$ are respectively centroid coordinates of the data sets $v_1$ and $v_{2m-r}$ of the blade local leading-edge curve features; and solve an eigenvector $\chi_d^{r1}$ and an eigenvalue $\lambda_d^{r1}$ according to the covariance matrix $COV(v_1)$, solve an eigenvector $\lambda_d^{r2m}$ and an eigenvalue $\lambda_d^{r2m}$, according to the covariance matrix $COV(v_{2m-r})$ and then establish a matching function between the maximum values $V_{1m}$ and $V_{2m-r}$ according to the eigenvectors $\chi_d^{r1}$ and $\chi_d^{r2m}$ and the eigenvalues and $\lambda_d^{r2m}$, $$M(V_{1m}, V_{2m-r}) = \Sigma_{d=1}^2 \|\lambda_d^{r1}\chi_d^{r1} - \lambda_d^{r2m}(R_\theta\chi_d^{r2m})\|^2$$

where, $\lambda_d^{r1}$ is the eigenvalue of the data set $v_1$; $\chi_d^{r1}$ is the eigenvector of the data set $v_1$; $\lambda_d^{r2m}$ is the eigenvalue of the data set $v_{2m-r}$; $\chi_d^{r2m}$ is the eigenvector of the data set $v_{2m-r}$; and $$R_\theta = \begin{bmatrix} \cos\theta & \sin\theta \\ -\sin\theta & \cos\theta \end{bmatrix}$$

is a rotation matrix.

(e) Select different reference points $V_{2m-r}$ to establish the data set $v_{2m-r}$ of the local leading-edge curve feature, and find a reference point $V_{2m-k}$ corresponding to a minimum value in a target function M, n points in left and right sides of the reference point $V_{2m-k}$ forming the data set $v_2=[V_{(2m-k)-n} \ldots V_{2m-k} \ldots V_{(2m-k)+n}]_{1\times(2n+1)}$ of the blade local leading-edge curve feature.

(f) Solve centroid coordinates $\overline{v_1}=(\Sigma_{i=1}^{2n+1}v_{1i})/(2n+1)$ and $\overline{v_2}=(\Sigma_{i=1}^{2n+1}v_{2i})/(2n+1)$ according to the profile data sets $v_1$ and $v_2$ of the blade local leading-edge curve features, and solve a rotation center $O_b$ according to the two centroid coordinates. Set that a vector of the $O_b$ to an origin $O_s$ of a data coordinate system $o_s-x_sy_s$ is $o_s o_b=[x \ y]=(R_\theta-E)^{-1}(R_\theta\overline{v_2}-\overline{v_1})$; (x, y) is coordinate data of the rotation center $O_b$ in the data coordinate system;

$$R_\theta = \begin{bmatrix} \cos\theta & \sin\theta \\ -\sin\theta & \cos\theta \end{bmatrix}$$

is the rotation matrix;

$$E = \begin{bmatrix} 1 & 0 \\ 0 & 1 \end{bmatrix}$$

is a 2*2 identity matrix; and $\overline{v_1}$ and $\overline{v_2}$ are respectively the centroid coordinates of the data sets $v_1$ and $v_2$ of the blade local leading-edge curve features.

Figure 4:
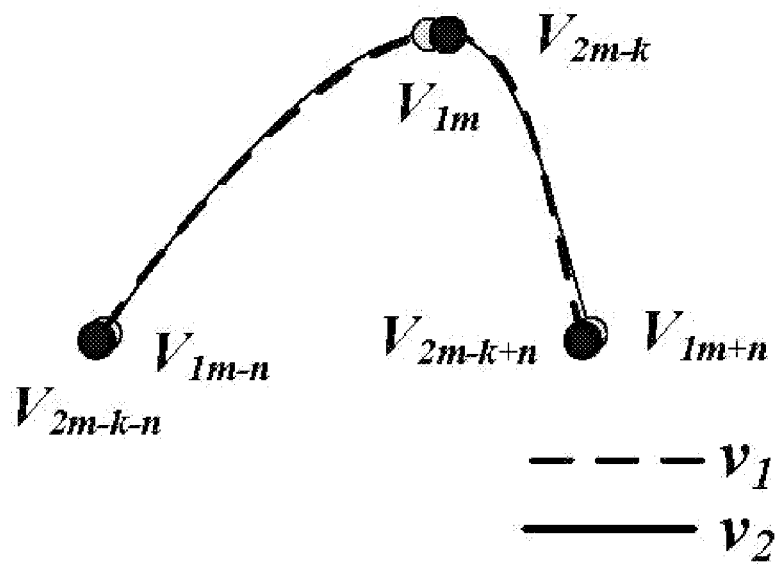
FIG. 4 is an overlapped schematic diagram of transformation of leading-edge curve features in two times to a rotation center according to the present disclosure.

By putting the profile data $V_1$ and $V_2$ acquired by the line structured-light sensor 100 for the leading-edge curve feature of the present blade 200 into $V_1^{ob}=V_1+o_s o_b$ and $V_2^{ob}=R_\theta(V_2+o_s o_b)$ in the data coordinate system $o_s-x_sy_s$, the blade local leading-edge feature curve is as shown in FIG. 4.

(3) Measurement on Blade Cross-Section Profile

Set that an n field of view (FOV) is employed by the cross section to acquire the complete cycle of profile data, the rotation angle corresponding to the FOV i is $\phi_i$, the translational parameter is $T_i=[x_i \ y_i]^T$, and the cross-section curve profile is $P=[V_1^{ob} \ V_2^{ob} \ldots V_i^{ob} \ldots V_n^{ob}]$, $V_i^{ob}=R_{\phi_i}(V_i+o_s o_b)$; $R_{\phi_i}$ being a rotation matrix of a turntable at the ith time, $V_i$ being data acquired by a line structured-light sensor at the ith time, and $o_s o_b$ being a vector from an origin of a data coordinate system to a rotation center.

Adjust the line structured-light sensor such that a laser plane intersects with a next target measured cross section, and repeat the above steps, thereby completely all measurement work of the blade.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:
1. A method for calibrating a rotation center based on a blade local leading-edge curve feature, comprising the following steps:
   (1) putting a blade onto a turntable plane, and adjusting a pose of a line structured-light sensor such that a laser plane of the line structured-light sensor intersects with a leading-edge curve feature of the blade, the line structured-light sensor acquiring profile data $V_1 \in \mathbb{R}^{2 \times n_1}$ of the leading-edge curve feature of the present blade, selecting the maximum value $V_{1m}$ in the profile data $V_1$, and respectively taking n points along left and right sides of the $V_{1m}$ to form a data set $v_1=[V_{1m-n} \ldots V_{1m} \ldots V_{1m+n}]_{1 \times (2n+1)}$ of a blade local leading-edge curve feature;
   wherein the data set $v_1$ of the blade local leading-edge curve feature is established through the following steps:
   selecting the maximum value $V_{1m}$ in the profile data $V_1$, and nth points $V_{1m+n}$ and $V_{1m-n}$ along the left and right sides of the $V_{1m}$; and calculating a distance $d_{Ln}$ from the maximum value $V_{1m}$ to a line connecting the $V_{1m+n}$ and the $V_{1m-n}$, and selecting the $V_{1m+n}$ and the $V_{1m-n}$ having the $d_{Ln}$ more than or equal to an optimal measuring value $d_z$ of the line structured-light sensor as endpoints of the blade local leading-edge data set, namely, the profile data set $v_1=[V_{1m-n} \ldots V_{1m} \ldots V_{1m+n}]_{1 \times (2n+1)}$ of the blade local leading-edge curve feature:

$$d_{Ln} = \frac{|Kx_{1m} - y_{1m} + (y_{1m-n} - Ky_{1m-n})|}{\sqrt{K^2+1}},$$

wherein, $d_{Ln}$ is the distance from the maximum value $V_{1m}$ to the line connecting the $V_{1m+n}$ and the $V_{1m-n}$; and K is a slope of the line connecting the $V_{1m+n}$ and the $V_{1m-n}$;
   (2) ensuring that the pose of the line structured-light sensor is unchanged, the laser plane of the line structured-light sensor still intersects with a leading-edge curve feature of the blade after rotation of the turntable, and a rotation angle θ is 1-3°, acquiring profile data $V_2 \in \mathbb{R}^{2 \times n_2}$ of the leading-edge curve feature at this time, first selecting a maximum value $V_{2m}$ in the profile data $V_2$, finding a point $V_{2m-r}$ corresponding to the maximum value $V_{1m}$ in step (1) near the maximum value $V_{2m}$, respectively taking c reference points $V_{2m-r} \in [V_{2m-c} \ldots V_{2m} \ldots V_{2m+c}]_{1 \times (2c+1)}$ along left and right sides of the $V_{2m}$, and forming a profile data set $v_{2m-r}=[V_{(2m-r)-n} \ldots V_{2m-r} \ldots V_{(2m-r)+n}]_{1 \times (2n+1)}$ of a blade local leading-edge curve feature with n points in left and right sides of the $V_{2m-r}$;
   (3) calculating covariance matrixes of the profile data sets $v_1$ and $V_{2m-r}$ of the blade local leading-edge curve features, solving eigenvectors and eigenvalues according to the covariance matrixes, and then establishing a matching function M between the maximum values $V_{1m}$ and $V_{2m-r}$ according to the eigenvectors and the eigenvalues:

$$M(V_{1m}, V_{2m-r}) = \Sigma_{d=1}^{2} \|\lambda_d^{r1}\chi_d^{r1} - \lambda_d^{r2m}(R_\theta \chi_d^{r2m})\|^2$$

wherein, $\lambda_d^{r1}$ is the eigenvalue of the covariance matrix of the data set $v_1$; $\chi_d^{r1}$ is the eigenvector of the covariance matrix of the data set $v_1$; $\lambda_d^{r2m}$ is the eigenvalue of the covariance matrix of the data set $V_{2m-r}$; $\lambda_d^{r2m}$ is the eigenvector of the covariance matrix of the data set $v_{2m-r}$; and $$R_\theta = \begin{bmatrix} \cos\theta & \sin\theta \\ -\sin\theta & \cos\theta \end{bmatrix}$$

is a rotation matrix;
   (4) constructing c corresponding data sets $v_{2m-r}$ formed by the n points in left and right sides of each of the c reference points $V_{2m-r}$, finding a reference point $V_{2m-k}$ of the c reference points corresponding to a minimum value in the matching function M, and taking the n points along left and right sides of the reference point $V_{2m-k}$ to form a data set $v_2=[V_{(2m-k)-n} \ldots V_{2m-k} \ldots V_{(2m-k)+n}]_{1 \times (2n+1)}$ of a blade local leading-edge curve feature; and
   (5) respectively solving centroid coordinates $\overline{v_1}$ and $\overline{v_2}$ according to the profile data sets $v_1$ and $v_2$ of the blade local leading-edge curve features: $\overline{v_t} = (\Sigma_{i=1}^{2n+1} v_{ti})/(2n+1)$, t=1, 2, and $\overline{v_1}$ and $\overline{v_2}$ being respectively the centroid coordinates of the data sets $v_1$ and $v_2$ of the blade local leading-edge curve features; and solving a rotation center $O_b$ according to the two centroid coordinates $\overline{v_1}$ and $\overline{v_2}$.

2. The method for calibrating a rotation center based on a blade local leading-edge curve feature according to claim 1, wherein the rotation center coordinate $O_b$ is solved with a following model:

$$O_b = [x \ y] = (R_\theta - E)^{-1}(R_\theta \overline{v_2} - \overline{v_1})$$

wherein, (x, y) is coordinate data of the rotation center $O_b$ in a data coordinate system;

$$R_\theta = \begin{bmatrix} \cos\theta & \sin\theta \\ -\sin\theta & \cos\theta \end{bmatrix}$$

is the rotation matrix $$E = \begin{bmatrix} 1 & 0 \\ 0 & 1 \end{bmatrix}$$

is a 2*2 identity matrix; and $\overline{v_1}$ and $\overline{v_2}$ are respectively the centroid coordinates of the data sets $v_1$ and $v_2$ of the blade local leading-edge curve features.

* * * * *